United States Patent [19]

Hausler et al.

[11] Patent Number: 4,859,834

[45] Date of Patent: Aug. 22, 1989

[54] POWER CONTROLLER FOR HEAT TRACING CABLE WHICH RESPONDS TO AMBIENT TEMPERATURE

[75] Inventors: Jeffery P. Hausler, New Braunfels; Paul C. Baria, Austin; Alfred Majek, Meadows; Jeffrey B. Moore, New Braunfels, all of Tex.

[73] Assignee: Letco Management Company, Inc., New Braunfels, Tex.

[21] Appl. No.: 207,188

[22] Filed: Jun. 15, 1988

[51] Int. Cl.$^4$ ............................ H05B 1/02; H05B 3/00
[52] U.S. Cl. ..................................... 219/497; 219/501; 219/494; 219/301; 374/134
[58] Field of Search ............... 219/494, 482, 490, 491, 219/497, 499, 501, 300, 301, 535, 308, 328, 505, 511; 236/68 R, 68 B, 68 C; 374/134, 185

[56] References Cited

U.S. PATENT DOCUMENTS

| | | | |
|---|---|---|---|
| 3,423,570 | 1/1969 | Trabilcy | 219/301 |
| 3,456,096 | 1/1969 | Bilbro | 219/501 |
| 3,706,872 | 12/1972 | Trabilcy | 219/301 |
| 4,002,881 | 1/1977 | West | 219/301 |
| 4,072,848 | 2/1978 | Johnson et al. | 219/528 |
| 4,150,281 | 4/1979 | Hinz | 219/535 |
| 4,484,061 | 11/1984 | Zelinka et al. | 219/301 |
| 4,564,747 | 1/1986 | Offermann | 219/482 |
| 4,575,617 | 3/1986 | Cooper | 219/494 |
| 4,606,320 | 8/1986 | McGhee | 219/301 |
| 4,725,713 | 2/1988 | Lehrke | 219/301 |

*Primary Examiner*—M. H. Paschall
*Attorney, Agent, or Firm*—Arnold, White & Durkee

[57] ABSTRACT

A power controller is provided for controlling the distribution of power to heat tracing cable or the like. Heat tracing cable is used for maintaining a desired process temperature in pipes or vessels when the outside ambient temperature falls below the desired process temperature. Based on outside air temperature the controller of the present invention determines the percent of power which should be supplied to the heat tracing cable network to maintain the temperature. The power controller hereof alters the length of time that power is supplied to the power network to control the amount of heat supplied. Advantageously, the power controller results in significant energy cost savings by supplying only the specific energy required to maintain the temperature in the heating cable network.

18 Claims, 4 Drawing Sheets

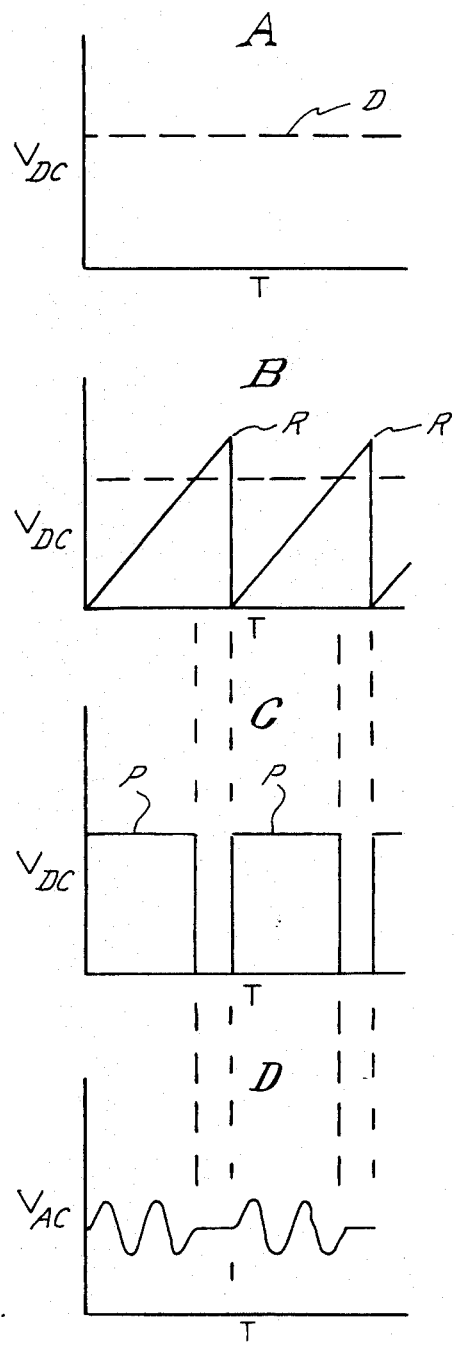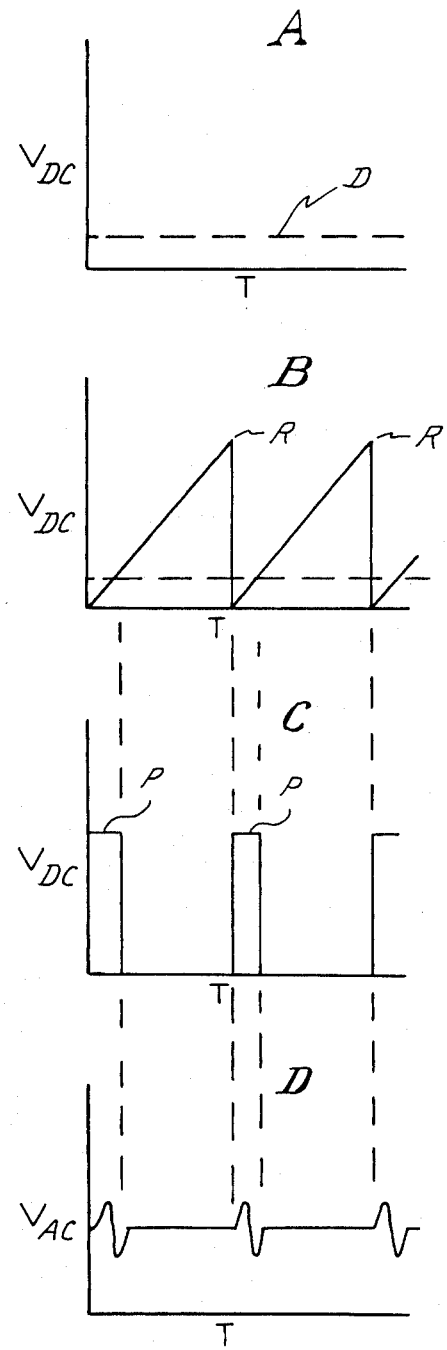

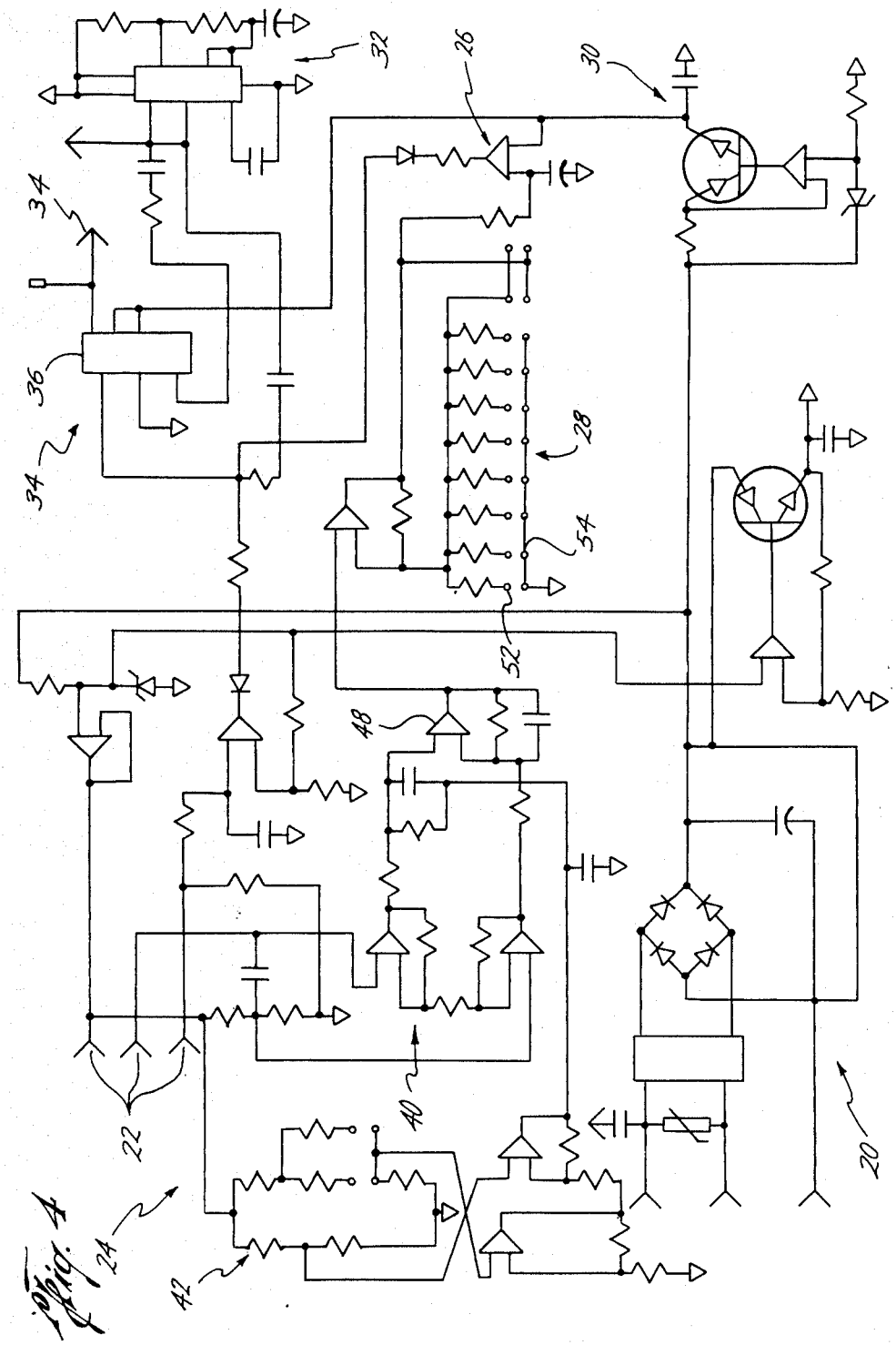

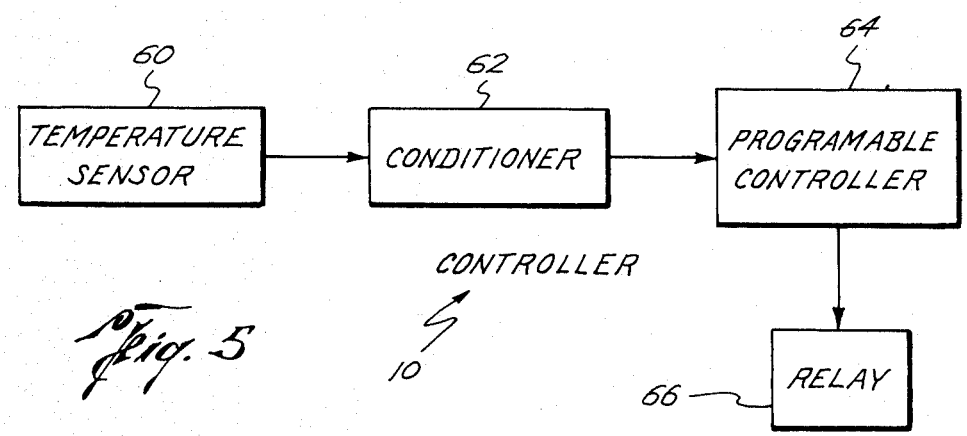
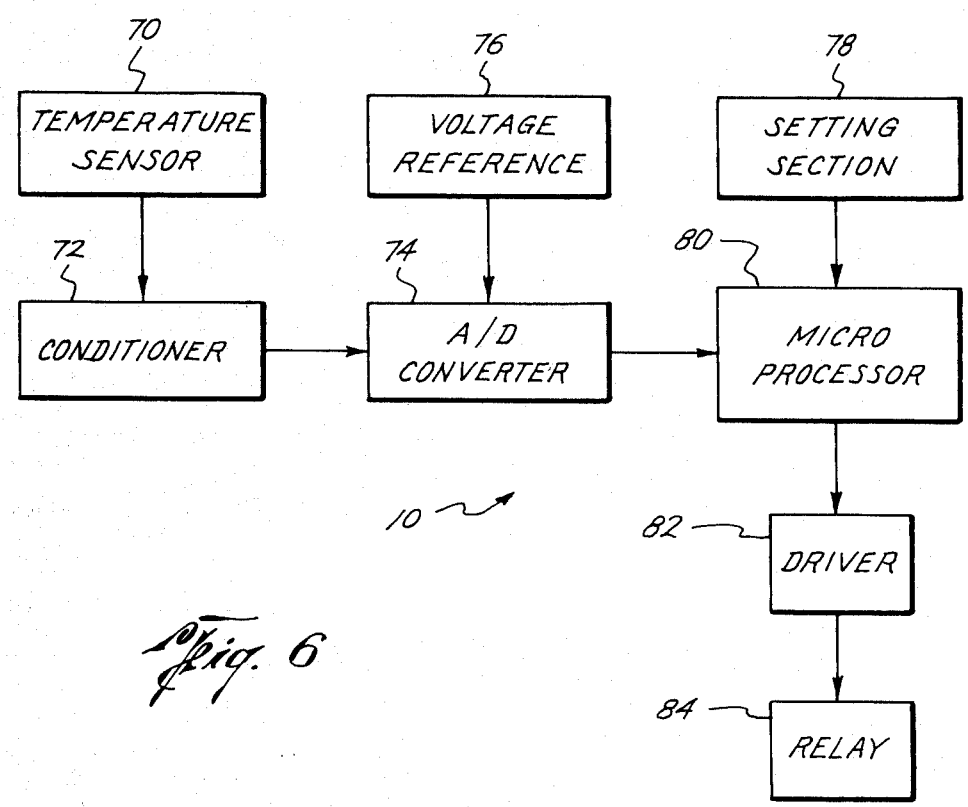

POWER CONTROLLER FOR HEAT TRACING CABLE WHICH RESPONDS TO AMBIENT TEMPERATURE

BACKGROUND OF THE INVENTION

1. Field of the Invention

This invention relates to a power controller for heat tracing cable or other types of electrical resistance heaters which regulates the amount of energy that is input to the load. For example, the controller may be used to maintain a process temperature in situations where liquids are to be prevented from freezing.

2. Description of Related Art

Electrical heat tracing cables are presently used in commercial and industrial markets to provide clean, reliable sources of heat for protecting chemical products and processes. These heaters may be found, for example, on storage vessels and pipe lines, where they are used to heat chemicals waiting transfer from one process function to another. That is, it is often necessary to heat a pipe or vessel to prevent freezing of the liquid or to maintain a certain process temperature in an environment where the ambient temperature may fall below the desired process temperature.

Electrical heater cable systems are typically selected on the basis of their heat output, which must meet or exceed the system's expected heat losses. Heat loss is normally calculated using standard formulas which include parameters such as temperature to be maintained, minimum expected ambient temperature, heat loss from wind, thermal insulation type and thickness, and installation area electrical classification. Heat tracing cable for a pipe installation would be chosen to counteract heat loss, calculated as:

Heat loss = $q \times \Delta T$ where q is expressed in watts/foot °F and depends on pipe size and insulation type and thickness, and $\Delta T$ is the difference between the desired maintenance temperature and expected minimum ambient temperature.

For example, for a 2" pipe size with 1" thick fiberglass insulation, q=0.070 (See, John Malloy, Thermal Insulation). To maintain a 40° F. pipe temperature (maintenance temperature) in a −20° F. environment (expected minimum ambient temperature)

Heat Loss = $(0.070) \times (60°)$ = 4.2 watts/foot.

Since 4.2 watts/foot is not a standard heater cable product, the designer might specify 6 watt/foot cable for the installation (giving protection to a minimum temperature of about −46° F.).

There are two types of electric heater cables in widespread use: constant output heaters and self-regulating heaters. The constant output heater cables produce the same amount of heat once they are triggered, regardless of the environment temperature. Heat is supplied from constant output cables for all ambient temperatures below the maintenance temperature. Typically, a thermostat initiates full rated power to constant output cables whenever the ambient temperature is below the maintenance temperature. Constant output cables receive their full rated output (e.g. 6 watts per foot) even if the ambient temperature is only slightly below the maintenance temperature. It follows that electrical energy is wasted by constant output heater cables as more heat is supplied than the environmental conditions require. In the above example, 6 watt/foot constant output cable could nominally maintain a 40° F. maintenance temperature down to about a 46° F. ambient temperature.

Self-regulating heater cables have been proposed as the answer to the wasted energy problem of constant output heater cables and as a prevention to overheating. See, U.S. Pat. No. No. 4,072,848. The self-regulatory cables are promoted on the basis that they supply only about the amount of heat required for actual heat loss. These cables adjust their output according to expansion and contraction of a semiconductive heat producing core. The semiconductor core contains electrically conductive particles (usually graphite) surrounded by heat sensitive plastic which permits or hinders electrical conduction. However, the self-regulating heaters must be energized at 50° F. for freeze protection systems to allow a sufficient response time for rapid changes in ambient temperature. Much higher activation temperatures may be required to provide sufficient heat if a higher process temperature is to be maintained. Additionally, the self-regulating semiconductor cores are very difficult to produce in large quantities. It has been the general practice to make several models of self-regulating heating cable each with a narrow range of energy output. Consequently, oversize self-regulating heating cable must often be used, which results in wasted energy and inefficiency.

The conventional method of controlling vast quantities of electric heater cable circuits for freeze protection is to distribute the power through a power distribution control center energized by an electro-magnetic contactor. A thermostat senses the ambient air temperature and energizes the heater cables at some triggering temperature such as 40° F. or 50° F. See e.g., U.S. Pat. No. 4,575,617. Thus, 100% of maximum rated power for the cable distribution network (as determined by the cable resistance) is supplied for any temperature below the triggering thermostat temperature. Constant output cables will draw all of the electricity according to their manufactured watt per foot outputs. Constant output cables have very little inrush current due to their fixed resistances. On the other hand, the self-regulating cables must heat up to find the thermal equilibrium temperature. Large quantities of inrush current lasting for several minutes may be associated with this process.

Still another method of controlling the power distribution is to use a bulb and capillary thermostat or other surface-mounted temperature sensor for determining the actual temperature of the fluid or container. The thermostat bulb or sensor is usually placed directly on the pipe or other equipment to sense the wall temperature (e.g. using a bimetallic strip, RTD, thermocouple, or thermistor). If the fluid temperature (or container temperature) falls below the maintenance temperature power is supplied to the heater cable. In this arrangement, a range or dead band will be set in which heat is supplied to the heater cable before the heat producing core attains thermal equilibrium. For example, the operator might set the thermostat to supply power to the heat tracing cable at 2° F. below the maintenance temperature and to continue the supply of power until the sensor detects 10° F. above the maintenance temperature. Whether the heat tracing cable is a constant output or self-regulating, this system is using more energy than necessary or desirable. Additionally, this configuration is problematic in that a number of sensors must be accurately placed on the pipe or vessel inside the insulation, which is sometimes difficult and inaccurate.

Therefore, it would be a significant advance in the art if a relatively simple apparatus and method were devised which regulated the power to heat tracing cable in a safe, energy efficient manner. That is, it would be advantageous if such a controller could assure maintenance temperature while supplying only the minimum necessary electrical power.

SUMMARY OF THE INVENTION

The present invention addresses the above problems by providing a power control system for heat tracing cable or other types of electrical resistance heaters which regulates the amount of energy that is passed to the heating cables based on ambient temperature. More particularly, the flow of energy to the heating cable is regulated in response to a signal which indicates what percentage of the maximum power should be passed to the heating cables. The present invention compares the sensed ambient temperature to the approximate operating temperature range and on the basis of that comparison regulates the amount of energy that passes through to the heating cables. The percentage of power supplied preferably reflects the quotient of the difference between the sensed ambient temperature and the desired maintenance temperature divided by the approximate operating temperature range of the device. The lower the sensed ambient temperature with respect to the operating temperature range, the greater the percentage of power that will be supplied to the heating cables. Conversely, the higher the sensed ambient temperature with respect to the operating temperature range, the less heat that will be supplied.

Broadly speaking, the controller of the present invention includes an ambient temperature sensor and a mechanism for setting the temperature range below the desired maintenance temperature. A signaling means is connected to the sensor and to the setting mechanism to provide a signal representative of the ratio of the difference between the sensed ambient temperature and the desired maintenance temperature to the temperature operating range. A power control gate such as a solid state relay, is coupled to the signaling means to control the supply of power to the heating cable in response to the ratio signal. Preferably, the signaling means operates to repetitively cycle power on and off during successive time periods. This time cycling is believed to be easier to implement than adjusting the voltage supplied to the heating cable network.

The method of the present invention broadly includes the steps of determining the approximate minimum ambient temperature at which the heating cable will maintain the desired maintenance temperature if the heating cables are operated at full rated power. The range between the minimum ambient temperature and preselected maintenance temperature is set, and the ambient temperature sensed. The difference between the sensed ambient temperature and preselected maintenance temperature is determined when the sensed ambient temperature is less than the preselected maintenance temperature. This difference is compared with the normal operating temperature range to obtain a ratio and a percentage of full rated power is supplied to the heating cables in proportion to this ratio. In the preferred embodiment, the heating cables are energized for a portion of a time period at full rated power, the proportion of each time period corresponding to the ratio.

BRIEF DESCRIPTION OF THE DRAWINGS

FIGS. 2A-D depict a series of graphs showing the duration of power supplied to heat tracing cable by a power controller of the present invention for a relatively low ambient temperature;

FIGS. 3A-D show a series of graphs depicting the duration of power supplied to heat tracing cable for an ambient temperature slightly below a desired maintenance temperature;

FIG. 4 is a circuit diagram of an analog embodiment of the power controller of the present invention;

FIG. 5 is a block diagram showing a programmable controller embodiment of the present invention; and FIG. 6 is a block diagram of a microprocessor embodiment of the present invention.

DESCRIPTION OF THE EMBODIMENTS

1. Preferred Embodiments

Figure 1:
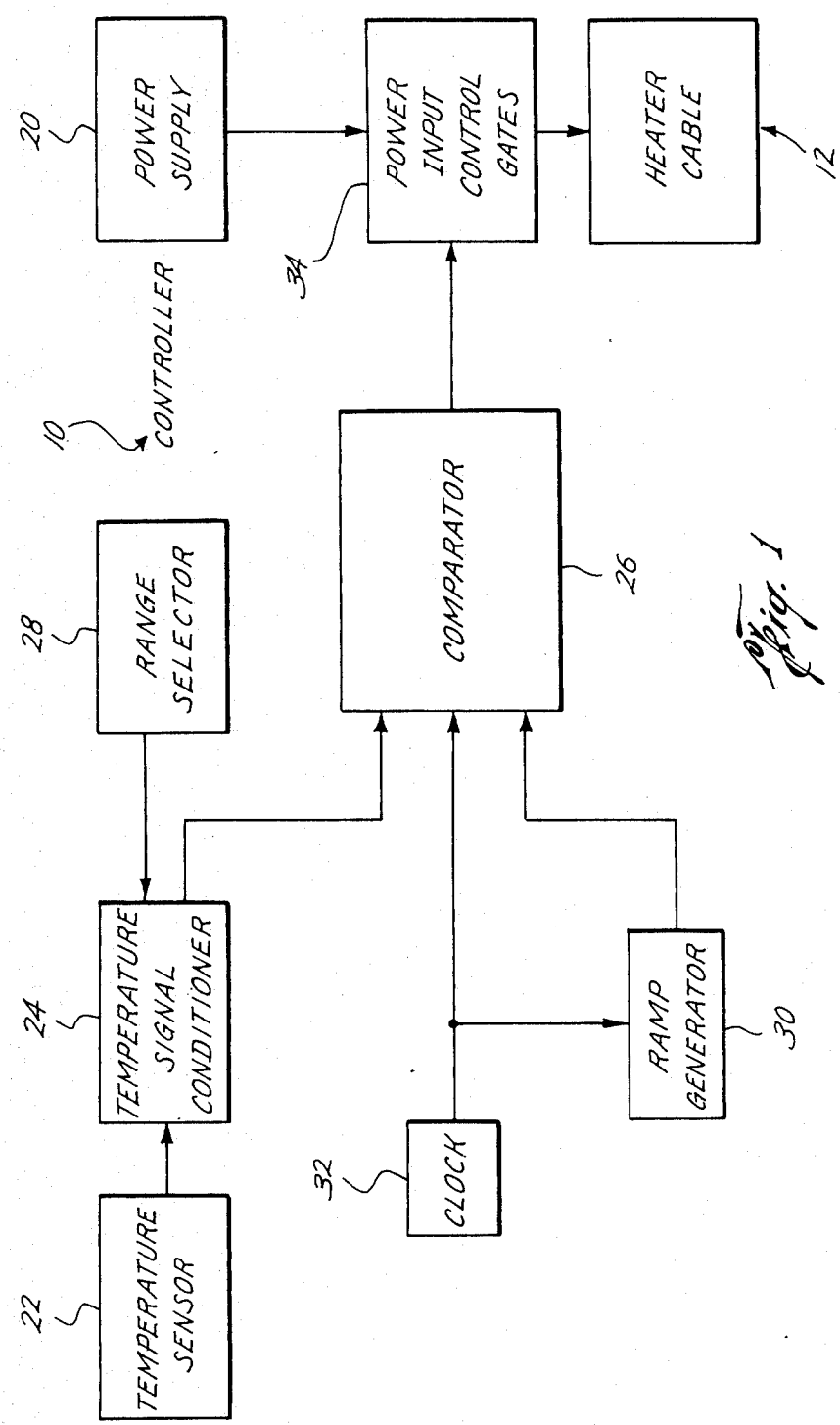
FIG. 1 is a block diagram of the power controller in accordance with the present invention.

In the drawings, FIGS. 1-4 describe a preferred embodiment of the present invention in which an analog circuit is described. Broadly speaking, the power controller 10 functions to supply power through a power distribution system to heating cable 12. In the illustrated embodiment, the heating cable 12 is of the constant output type which draws electricity according to its manufactured watt per foot specification. While the heating cable 12 may be of the self-regulating type, it will be appreciated that heat-up is required to find the thermal insulation heating equilibrium temperature, resulting in large quantities of inrush current during heat-up. Since constant output type cable has minimal inrush current, standard circuit breakers are utilized in the illustrated embodiment for the heating cable circuits. Self-regulating type heater cable requires oversized circuit breakers to compensate for inrush current and ground fault indicators for safety protection.

Turning to FIG. 1, power supply 20 provides 120 volts AC/60 Hz and includes a transformer/regulator circuit for providing 7 volts DC for internal logic functions. The transformer is preferably isolated to eliminate any potential ground loops associated with temperature sensing. The ambient temperature sensor 22 is preferably a 100 ohm platinum sensor resistance temperature detector ("RTD") having a temperature resistance coefficient of 0.00385 ohm per ohm per ° C. The temperature signal conditioner 24 receives the ambient temperature signal from the temperature sensor 22 and processes the signal to obtain an amplified constant voltage signal suitable for input to the comparator 26.

In the illustrated embodiment, the temperature and range selector 28 sets the desired maintenance temperature into the signal conditioner 24, which generates an amplified constant voltage signal representative of the difference between the sensed ambient temperature and the desired maintenance temperature. FIGS. 2A and 3A illustrate this amplified constant voltage signal ("difference signal" denoted "D" in the drawing). FIG. 2A represents a difference signal D in which the difference between the sensed ambient temperature and the desired maintenance temperature is large, producing a relatively large difference signal. FIG. 3A shows a difference signal D produced when the sensed ambient temperature is slightly less than the desired maintenance temperature and, thus a relatively small difference signal. If the sensed ambient temperature is equal to the desired maintenance temperature, no signal is produced. In the preferred embodiment, the difference signal ranges from 0-5 volts, with FIG. 2A illustrating a 4 volt signal (4/5 or 80%) and FIG. 3A illustrating a 1 volt signal (1/5 or 20% power).

The temperature and range selector 28 allows the operator to designate the nominal range over which the heating cable will operate. The nominal temperature operating range is the difference between the desired maintenance temperature and the minimum ambient temperature at which the heater cable if fully powered can obtain the desired maintenance temperature. In the embodiment of FIGS. 1-4, the desired maintenance temperature can be set at either 40° F. or 50° F. and the minimum ambient temperature can be set at a temperature ranging from about −60° F. to +20°F. in 10° F. increments.

The ramp generator 30 is clocked by 32 and generates a ramp signal ("R" in the drawing) which is provided as an input to the comparator 26. The output R from the ramp generator 30 to the comparator 26 is illustrated in FIGS. 2B and 3B. In the illustrated embodiment, the ramp starts at the beginning of each period at 0 volts DC and reaches a peak voltage at the end of the period. The peak voltage is selected to meet or exceed the constant difference signal D from conditioner 24 (FIGS. 2A or 3A), o and as illustrated, is about 5 volts.

The comparator 26 receives the ramp signal R (FIGS. 2B and 3B) and the difference signal D (FIGS. 2A and 3A) at each clock pulse of the clock 32. The comparator 26 makes repetitive comparisons over time of the ramp signals R and difference signals D provided by the ramp generator 30 and conditioner 24 respectively. The comparator 26 produces a pulse signal ("P" in the drawing) to the power input control gate 34 when power is to be supplied (FIGS. 2C and 3C). The time periods for the comparator 26 and ramp generator 30 are equal (1 second clock periods in the drawing). As can be seen from FIGS. 2C and 3C, a pulse signal P is generated whenever the ramp signal R is below the difference signal D, and the pulse signal P stops as soon as the ramp signal R exceeds the difference signal D. This results in the power control gate 34 being turned on and off when the ramp signal crosses the temperature signal. In the preferred embodiment, the power control gate 34 comprises a zero-crossing solid state relay, which minimizes harmonic interference in the heating cables 12. FIGS. 2D and 3D show the AC signal passed through such a zero-crossing relay from power source 20 to the heater cable 12.

Turning now to FIG. 4, the specifics of the analog embodiment is illustrated in more detail. As can be seen, the temperature sensor 22 is connected to the circuit using a three wire technique. The temperature sensor 22 is preferably a 100 ohm platinum, resistance temperature detector and a three wire technique provides a lead length compensation to minimize errors produced by hook-up wiring. As can be seen, the input from the RTD 22 is provided to the signal conditioner circuitry 24, comprising an instrument amplifier section 40 and emulator section 42. In the illustrated embodiment, the amplifier section 40 receives the ambient temperature signal from the RTD 22 and gives a gain (Gain =72 in the drawing).

The emulator section 42 outputs a reference signal corresponding to the desired maintenance temperature. As can be seen, a resistor bridge is configured to emulate the bridge on the RTD 22 and includes selectable resistances to select the desired maintenance temperature. In the illustrated embodiment, one jumper selects a 50° F. maintenance temperature, while the other jumper selects 40° F. A pair of op amps are provided and coupled to the bridge to give a gain approximately equivalent to the instrument amplifier section 40 (Gain =72). The result is that the op amps give a signal gain to generate a reference signal corresponding to the selected maintenance temperature (e.g. 40° F. or 50° F.).

The maintenance temperature reference signal from emulator section 42 and the actual ambient temperature signal from amplifier section 40 are both supplied to the op amp 48. Op amp 48 acts as a summing junction to generate a signal indicative of the difference between the sensed ambient temperature and the desired maintenance temperature. For example, if a 40° F. maintenance temperature is selected in the emulator section 42 and an ambient temperature less than 40° F. is input to the instrument amp section 40 from the temperature sensor 22, the summing amplifier 48 would output a constant voltage signal indicative of the difference between sensed ambient temperature and 40° F.

The range selector 28 receives the constant voltage signal from the summing amplifier 48 and amplifies it for use by the comparator 26. The op amp gain is selected using jumpers to set the appropriate range. That is, the resistances are selected to indicate the approximate range of operation. The upper connections 52 are used for a 40° F. maintenance temperature, while the lower connections 54 are used for a 50° F. maintenance temperature. The far left resistor in the bank 52 represents a +20° F. minimum ambient temperature (range = +40° F. to +20° F.), while the far right resistance represents a −60° F. minimum ambient temperature (range = +40° F. to −60° F.). The end result is that the range selector section 28 gives a variable gain to the constant voltage signal from amp 48 to create the operating span. The range section 28 is designed to produce 0 volt when the ambient temperature equals the desired maintenance temperature and have a 5 volt output whenever the ambient temperature is at or below the selected minimum ambient temperature.

As can be seen from FIGS. 1-4, the output from range selector 28 is the difference signal D, and is one input to the op amp acting as the comparator 26. The other input to comparator 26 is from the ramp generator 30. The comparator section 26 is thus seeing the signals as illustrated in FIGS. 2B or 3B, and generates the appropriate pulse P as illustrated in FIGS. 2C or 3C.

In the upper right hand corner of FIG. 4, clock 32 (TLC 555) generates the one second time period. The pulse signal P from the comparator 26 is supplied to a one shot 36 which operates the control gate section 34 (a zero-crossing solid state relay). An LED is provided to determine when the one-shot 36 is on or off. As can be appreciated, the relay 34 permits the AC current flow as illustrated in FIGS. 2D and 3D.

2. Operation

In operation, the power controller 10 of the present invention can be installed with a new heating cable system or retrofitted to an existing heating cable system. In installing a new system, the designer selects the heat tracing cable according to the minimum expected ambient air temperature. Typically, such temperature is obtained for a specific geographic location (from e.g., National Oceanic and Atmospheric Administration).

The designer or owner of an installation has a number of design options and safety factor choices during installation. For example, the designer might use the 100 year low temperature as the minimum ambient temperature at which the system will maintain the desired process temperature. Alternatively, the designer might use the yearly average minimum ambient temperature for the geographic location. Because the temperature only rarely drops to the minimum ambient temperature the nature of the process may dictate the safety considerations. Additionally, the designer may for a specific process choose not to incorporate the wind chill factor to arrive at the desired minimum ambient air temperature.

For a pipe installation, the designer determines heat loss in watts per foot based on the desired minimum ambient temperature. As previously stated, Heat loss $= q \times \Delta T$ where T equals the desired maintenance temperature minus the desired minimum ambient temperature, and q is dependent upon the pipe size and insulation. The quantity q is usually derived from standard heat transfer formulas, such as found in John F. Malloy, Thermal Insulation. In this example, q is calculated as follows:

$$q = \left( \frac{1}{\frac{r_2 \ln \frac{r_2}{r_1}}{K} + \frac{1}{f}} \right) \frac{(2 \pi r_2)(1.2)}{(12)(3.413)}$$

where:
- $r_2$ = the pipe insulation outer radius
- $r_1$ = the pipe insulation inner radius
- K = thermal conductivity of the particular insulation and incorporates wind chill
- $1/f$ = film coefficient (=0.27) and the "1.2" in the numerator of the second term represents a 20% safety factor.

Ideally, the calculated heat loss would equal a standard heat tracing cable specification. However in practice, the calculated heat loss usually falls between two standard products and the designer specifies one of the two standard products (perhaps considering safety factors). For example, if 4.2 watt per foot is the calculated heat loss the designer might specify 6 watt per foot heater cable.

The desired maintenance temperature depends on the process. However, in most standard electrical heat tracing cable installations 40° F. is used for constant watt output heating cable, while 50° F. is used for self-regulating heat tracing cable. The higher temperature for self-regulated cable allows sufficient response time to rapid changes in ambient temperatures. Additionally, self-regulating heater cables do not maintain a constant temperature because of their continual flux around thermal equilibrium, and thus a slightly higher maintenance temperature is typically used.

In a conventional heat tracing cable installation, if a large quantity of heater cable circuits are used for freeze protection, then a power distribution network is set up. Such an installation might be, for example, in a petroleum refinery located in a colder climate having a large number of cable networks. In a conventional installation, a thermostat senses the ambient air temperature and energizes the heater cable distribution network whenever temperature drops below the maintenance temperature, either 40° or 50° F. depending upon whether constant output or self-regulated cable is used in the installation. Thus, the thermostat provides that the cable electrical distribution network is fully powered whenever the ambient air temperature drops below the desired maintenance temperature. This, of course, is a great waste of electricity where the ambient temperature is only slightly below the maintenance temperature.

In the present invention, the thermostat of conventional systems is eliminated, and the power controller 10 illustrated in the drawings controls the supply of power to the heater cable distribution system 12. In FIGS. 1-4, a constant output electrical tracing cable installation is illustrated. Accordingly, the desired maintenance temperature is set at 40° F. In FIG. 4, in the emulator section 42 the right hand resistance jumper is the 40° F. selection.

As an example, if it is assumed that th pipe installation to be protected comprises 2"diameter pipe (nominal) with 1" thick fiberglass, q =0.070 (from the Malloy formula). Additionally, assume that for the geographic location of the pipe installation, it is desired to maintain the temperature down to about −20° F. ambient temperature (i.e. "desired minimum ambient temperature"). Therefore, heat loss =0.070×60 =4.2 watt per foot. Of course this is a worst case scenario, and the designer might choose a standard cable product such as a 4 watt per foot or 6 watt per foot constant output heater cable. In this example, if the designer chooses 6 watt per foot heater cable output, the cable network 12 if fully energized will give protection to about −45° F. As shown in FIGS. 1 and 4, the installer selects the appropriate temperature range on range selector 28. In the range selector 28 of FIG. 4, the upper jumper contacts 52 are for a 40° F. maintenance temperature and the resistances are selected in 10° increments starting at 20° F. (far left) to −60° F. (far right). In this example, −45° F. falls halfway between the seventh and eighth jumpers but because only −20° F. protection was necessary, the installer would probably connect the resistance for only the seventh resistor (i.e. −40° F. minimum ambient temperature).

In this example, if the RTD temperature sensor 22 senses an outside ambient temperature of about 0° F. the controller 10 would be expected to supply about 50% power to the heater cable distribution network 12. This is because 0° F. is about halfway in the temperature range (range = +40° F. to −40° F.). As can be appreciated from FIG. 4, the sensor 22 produces an ambient temperature signal proportional to 0° F., with gain enhanced in the instrument amplifier section 40 (gain=72). The 40° F. maintenance temperature reference signal is output from the emulator section 42, and the ambient temperature signal and reference signal compared at the summing amplifier 48. The range selector 28 amplifies the signal from the summing amplifier 48 in the range of 0–5 volts. In this example, about a 2.5 volt difference signal D is output to the comparator 26. This difference signal D is similar to the outputs depicted in FIGS. 2A and 3A for 4 volt and 1 volt respectively.

As shown in FIG. 4, the clock 32 is continuously applying a timing pulse to the circuit, in the preferred embodiment a one second time period. Therefore, the ramp generator 30 supplies a ramp signal R over a one second time period to the comparator 26. The ramp signal R is compared to the difference signal D from the range selector 28 (as in FIGS. 2B and 3B). The output of the comparator 26 to control gate 34 is a pulse P, which repetitively turns the gate 34 on and off in the one second time period (e.g. FIGS. 2C and 3C). In this example with 50% power applied, the heating cable 12 is cycled on for 0.5 seconds then off for 0.5 seconds. This gives an effective power output of 3 watt per foot for the 50% powered 6 watt per foot cable. To verify that this does offset the heat loss at 0° F., Malloy's equation gives Heat Loss =(0.070)(40) =2.8 watt per foot. In the preferred embodiment, the solid state relays are zero crossing, so that conduction always begins at the 0 voltage point in the AC cycle (the point at which the AC voltage changes polarity). Turning on the solid state relays in this manner minimizes the generation of electromagnetic interference and is particularly appropriate for resistive loads such as constant output computer cable. For higher inrush loads such as may be expected in self-regulated cable, a phase angle fired solid state relay is believed more appropriate.

3. Alternative Embodiments

While the load illustrated in FIGS. 1–4 is a constant output heat tracing cable for a pipe installation, there are many other types of loads which may be operated by the controller 10 of the present invention. The controller 10 is equally adaptable for use with constant watt self-regulating cable. Both types of heating cable have been used in a variety of applications such as vessels, tanks, pumps and many other types of process equipment for fluid freeze protection. Additionally, structures and supports such as slabs, foundations, roofs, gutters, or down spouts have used heat tracing cable for snow or ice melting.

Additionally, FIGS. 1–4 illustrate a power controller 10 which is essentially an analog device that can be made in a wide variety of ways. For example, instead of the emulator section 42, a pot can be used to generate the reference voltage. Further, the ramp generator 30 could be modified to begin at a voltage corresponding to the maintenance temperature setting (instead of 0 volt DC) to reach a peak voltage corresponding to the temperature range setting. In this case, the constant voltage output (FIGS. 2A and 3A) would represent the sensed ambient temperature, rather than the difference between the sensed ambient temperature and the maintenance temperature.

In the preferred embodiment, power to the cable network 12 is controlled by timing. That is, full rated power is supplied for a portion of each time period according to a desired percentage (i.e. for 50% power, full rated power is supplied 0.5 second in each 1 second period). Alternatively, voltage could be regulated to achieve the desired percentage of full rated power. However, voltage regulation is a nonlinear function (Power $=I^2R = V^2/R$) and is believed to be less desirable than the timing method of the preferred embodiment.

There are, of course, many other types of temperature sensors which can be utilized in the present invention other than the resistive temperature detector illustrated, such as thermocouples, thermistors, or other type of temperature sensors. Further, the temperature range selector 28 could use dual in-line package switches instead of simple jumpers as illustrated.

FIGS. 5 and 6 illustrate digital varieties of the power controller 10 in accordance with the present invention. In FIG. 5 a programmable controller 10 is illustrated which uses inputs from a temperature sensor mechanism such as the resistance temperature detector 60. The output of the temperature sensor 60 is conditioned as at 62 and transmitted to the programmable controller 64. The programmable controller 64 takes the conditioned analog input indicative of the ambient temperature and outputs a digital signal to control the operation of the solid state relay 66. The desired maintenance temperature and operating range are programmed into the programmable controller 64. Based on the ambient temperature signal, the programmable controller 10 determines the percent of maximum rated power which should be delivered to the cable distribution system 12 through the relay 66.

In FIG. 6, a basic microprocessor version of the controller 10 is illustrated. In FIG. 6, the temperature sensor 70 (RTD, thermocouple, thermistor, etc.) inputs a signal representative of the ambient temperature to the signal conditioner 72. The amplified ambient temperature signal is converted from analog to digital in the A/D convertor 74. Preferably, the voltage reference 76 is provided to compensate for temperature drift. The desired maintenance temperature and operating range are input through the reference setting switches 78 to the microprocessor 80. The microprocessor 80 is programmed such that with the maintenance temperature and range information, it will receive the digital signal representative of the current ambient temperature from the A/D convertor 74 and output a digital signal indicative of percentage of maximum rated power which should be supplied to the power distribution network. The digital output indicative of the percent of power is fed through the driver 82 to control the solid state relays 84.

What is claimed is:

1. A controller for powering electrical heating element, such as heating cable, comprising:
    means for sensing ambient temperature;
    means for setting the desired maintenance temperature and for setting the approximate temperature operating range below the desired maintenance temperature over which the controller is to supply power to the heating element;
    signaling means connected to the temperature sensing means and to the setting means for providing a signal representative of the ratio of —
        (i) the difference between the sensed ambient temperature and the desired maintenance temperature to
        (ii) the approximate temperature operating range; and
    means coupled to the signaling means for controlling the power supplied to the heating element in response to the ratio signal.

2. A power controller as recited in claim 1, wherein the heating element has a maximum rated power and the controlling means supplies power to the heating element equal to the product of the ratio multiplied by the maximum rated power.

3. A power controller as recited in claim 1, in which the temperature sensing means comprises a resistance temperature detector for measuring the ambient temperature.

4. A power controller as recited in claim 6, in which the temperature sensing means further comprises lead length compensation by a three wire bridge for minimizing errors induced by the resistance of the leads.

5. A power controller as recited in claim 1, in which the setting means includes jumpers to select a resistance indicative of said temperature range.

6. A power controller as recited in claim 1, in which the sensing means operable for producing a signal corresponding to the ambient temperature, the signaling means includes an emulator circuit for producing a reference signal corresponding to the desired maintenance temperature, and a summing circuit which produces a signal indicative of the difference between the reference signal and ambient temperature signal.

7. A power controller as recited in claim 1, the signaling means including ramp means for repetitively generating a ramp signal which rises from a first voltage to a second voltage in a time period.

8. A power controller as recited in claim 7, in which the sensing means is operable for generating a constant voltage signal indicative of the difference between the ambient temperature and the desired maintenance temperature, and the signaling means includes means for comparing the ramp signal to the difference signal to determine said ratio.

9. A power controller as recited in claim 8, the comparing means generating an "on" signal in each period when the ramp signal is less than the difference signal, and said controlling means being operable to supply power to the heating element during said "on" signal.

10. A power controller as recited in claim 9, in which the Controlling means comprise a gate means connected to the signaling means for supplying the power to the heating element in response to the "on" signal from the comparing means.

11. A power controller as recited in claim 1, in which the controller means comprises a zero crossing relay for eliminating harmonic distortion in the heating element that may otherwise arise from inputting an alternating current power supply into the heating element.

12. A power controller as recited in claim 1, the heating element having a maximum rated power, the controlling means being operable for supplying maximum rated power to the heating element, with the heating element attaining about the desired maintenance temperature when the sensed ambient temperature equals about the minimum ambient temperature of said operating range.

13. A method of controlling the power in electrical heating cable or element to maintain a preselected maintenance temperature in a structure, comprising the steps of:
   determining the approximate minimum ambient temperature at which the heating cable will maintain the preselected maintenance temperature if operated at about full rated power;
   setting the preselected maintenance temperature;
   setting the approximate operating range between the minimum ambient temperature and preselected maintenance temperature;
   sensing the ambient temperature in the vicinity of the structure;
   determining a difference between the sensed ambient temperature and the preselected maintenance temperature when the sensed temperature is less than the preselected maintenance temperature;
   comparing said difference with said range to obtain a ratio; and
   supplying a percentage of said full rated power to the heating cables in proportion to said ratio.

14. The method according to claim 13, said supplying step comprising multiplying said full rated power of said heating cable by said ratio to obtain said percentage.

15. The method according to claim 13, said supplying step including the substeps of
   sending power to said heating cables over a number of time periods;
   energizing said heating cables in each time period at about said full rated power of said heating cable for a duration in each period representative of said percentage.

16. A system for maintaining the temperature of a structure, at or above a desired maintenance temperature, comprising:
   heat tracing cable coupled to the structure;
   a power supply; and
   a power controller interconnecting the cable and power supply having
      sensor means for producing a signal indicative of the ambient temperature,
      reference means for setting the desired maintenance temperature and for producing a signal indicative of said maintenance temperature,
      range means for selecting the approximate temperature range below said maintenance temperature in which the heat tracing cable will heat the structure to at or above the maintenance temperature, and
      comparator means coupled to said sensor means and reference means for producing a signal indicative of the difference between the ambient temperature signal and maintenance temperature signal, and coupled to the range means for comparing the difference signal to the range to obtain a ratio, and
      gate means coupled to said comparator means for supplying power form said power supply to said cable corresponding to said ratio.

17. The system according to claim 16, the comparator means being operable for generating a pulse in a time period having a pulse width relative to the time period corresponding to said ratio.

18. The system according to claim 17, the comparator means including a ramp means for generating a ramp signal rising in voltage in said time period, said comparator means being operable for generating said pulse when the voltage of the difference signal exceeds the voltage of said ramp signal.

* * * * *